(12) United States Patent
Kodama

(10) Patent No.: US 7,162,602 B2
(45) Date of Patent: Jan. 9, 2007

(54) MORE GRANULAR AND MORE EFFICIENT WRITE PROTECTION FOR DISK VOLUMES

(75) Inventor: Shoji Kodama, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 357 days.

(21) Appl. No.: 10/800,737

(22) Filed: Mar. 16, 2004

(65) Prior Publication Data
US 2005/0210211 A1    Sep. 22, 2005

(51) Int. Cl.
G06F 12/14    (2006.01)
(52) U.S. Cl. ...................... 711/163; 711/112
(58) Field of Classification Search ............ None
See application file for complete search history.

(56) References Cited

U.S. PATENT DOCUMENTS

| | | | |
|---|---|---|---|
| 4,974,156 A * | 11/1990 | Harding et al. ............. | 711/162 |
| 5,043,967 A | 8/1991 | Gregg et al. | |
| 5,321,824 A | 6/1994 | Burke et al. | |
| 5,491,807 A | 2/1996 | Freeman et al. | |
| RE35,881 E | 8/1998 | Barrett et al. | |
| 5,790,848 A | 8/1998 | Wlaschin | |
| 6,108,285 A | 8/2000 | Freeman et al. | |
| 6,370,534 B1 | 4/2002 | Odom et al. | |
| 6,542,971 B1 | 4/2003 | Reed | |
| 2003/0018878 A1 | 1/2003 | Dorward et al. | |
| 2004/0065744 A1* | 4/2004 | Shiraishi et al. ............. | 235/492 |
| 2004/0220959 A1* | 11/2004 | Rothman et al. ........... | 707/102 |
| 2006/0010150 A1* | 1/2006 | Shaath et al. ............... | 707/102 |

* cited by examiner

Primary Examiner—Reginald Bragdon
Assistant Examiner—Daniel Ko
(74) Attorney, Agent, or Firm—Mattingly, Stanger, Malur & Brundidge, P.C.

(57) ABSTRACT

A storage system, method and system for protecting data stored on a volume of the storage system. The storage system includes a storage media upon which the volume is represented, a disk controller which controls the storage system, and a write once read many (WORM) configuration table having a plurality of entries which indicate by use of a next write pointer which of a plurality of areas of the volume is write protected. Alternatively, the entries of the WORM configuration table could indicate write protected areas of the volume each being defined by use of a beginning offset and an ending offset.

17 Claims, 9 Drawing Sheets

Volume "Vol0"

WORM Configuration Table For Embodiment 1 (108a)

| Volume ID (201) | WORM (202) | Block Size (203) | Max Block Number (204) | Next Write Pointer (205) | Retention (206) |
|---|---|---|---|---|---|
| Vol0 | ON | 512 [Bytes] | 1024 | 3 | 128 [days] |
| Vol1 | ON | 1 [MBytes] | 4096 | 4097 | 325 [days] |
| Vol2 | OFF | 0 [KBytes] | 0 | 0 | 0 [days] |

FIG. 2

WORM Configuration Table For Embodiment 2 (108b)

| Area ID (301) | Volume ID (302) | Beginning Offset (303) | Ending Offset (304) | Retention (305) |
|---|---|---|---|---|
| Area0 | Vol0 | 2 | 3 | 2 [days] |
| Area1 | Vol0 | 6 | 8 | 350 [days] |
| Area2 | Vol1 | 30 | 34 | 12 [days] |

MORE GRANULAR AND MORE EFFICIENT WRITE PROTECTION FOR DISK VOLUMES

BACKGROUND OF THE INVENTION

The present invention relates generally to techniques for long term data archiving in a storage system. More particularly the present invention relates to a storage system and method for protecting data on a disk volume by managing a write pointer or a write protected area.

Conventionally, long term data archiving has been accomplished write once read many (WORM) storage media. Recently the need for long term data archiving has increased. This need has been made more acute, for example, by the passage of various regulations. These regulations include, for example, Regulations like SEC (Securities and Exchange Act) and 21 CFR (Code of Federal Regulations) Part 11 of the Food and Drug Administration act. These regulations require regulated companies to keep data for a long term. An important factor in such regulations is that the data must not be changed during the retention period. As the result, the data need to be stored on WORM storage media.

Logical device (LDEV) Guard disk subsystems have WORM capability. With this capability, if a volume is set to be write-protected, no one can write or change any data stored on the volume. Since data need not to be kept after an expiration of a period required by the regulations, LDEV guard provides a retention period for a volume. After expiration of the retention period, users can then write and change data on the volume. The storage system has an internal timer for this purpose.

However, some regulations require a strict WORM implementation where the WORM setting cannot be altered by anyone in the world. Similarly, such strict WORM implementation requires that the retention period or the internal timer in the storage system cannot be altered.

Further, LDEV does not allow for granularity of Write-Protected Area. Particularly, because LDEV guard protects data at a volume level, sometimes it's not useful. The typical size of a volume is several GBytes. On the other hand, the typical size of a file which users want to archive is tens of hundreds of MBytes. As the result, the volume can't be set to a write-protected state until the volume is filled by many files. During this period, there is no write-protection for files in the volume.

Still further, the large size of the data structure can be a problem. Because there are a large number of disk blocks in the disk array, when the storage system provides a write protection at a disk block level, the size of a data structure that tracks the write protected disk blocks and the retention period for these write protected disk blocks becomes very large. Sometime the size of the data structure requires a large amount of memory in the storage system, thereby increasing the cost of the storage system.

SUMMARY OF THE INVENTION

The present invention provides an apparatus, method and system for protecting data on a disk volume by managing a write pointer or a write protected area.

More particularly the present invention provides an apparatus, method and system for managing a next write pointer for each WORM-enabled volume. According to the present invention the next write pointer indicates which disk block number on the volume a host can write data. If the disk block pointed to by the next write pointer was already written, then the next write pointer is incremented so as to point to the next disk block at which data has not been written by the host. Further according to the present invention a write request from a host is ignored or an error message is returned by the storage system if the disk block number indicated by the write request is less than the disk block number pointed to by the next write pointer.

The present invention provides another apparatus, method and system for managing a write-protected area. According to the present invention a write-protected area is identified by using a volume ID in a storage system, a beginning offset of the protected area in the volume, and an ending offset of the protected area in the volume. As per the present invention a write request from a host is ignored or an error message returned by a storage system, if an offset indicated by the write request is within one of write-protected areas. Further as per the present invention two or more write-protected areas are combined into one write-protected area, if these areas form a continuous area on the volume. When such combining is performed, the longest retention period within the combined write-protected areas is selected as the retention period for the combined write-protected areas.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

FIG. 2 is a first embodiment of a WORM configuration table according to the present invention;

FIG. 3 is a second embodiment of a WORM configuration table according to the present invention;

DETAILED DESCRIPTION OF THE INVENTION

Figure 8:
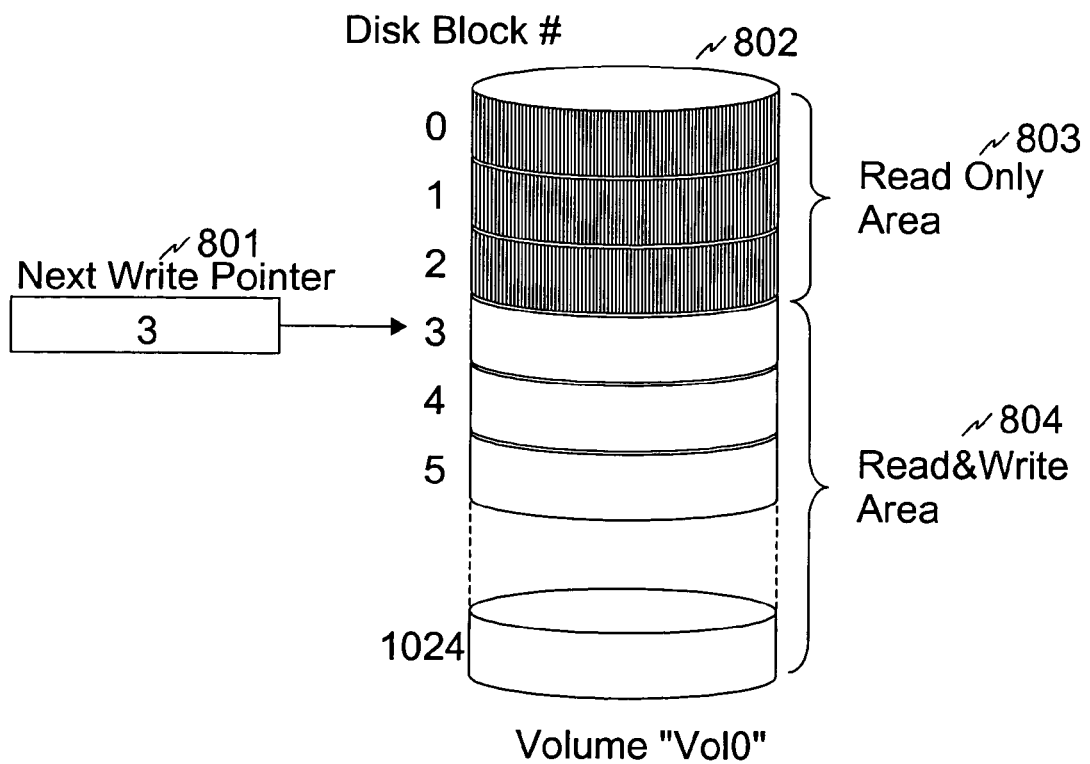
FIG. 8 is a diagram for explaining use of a next write pointer according to the present invention.

The present invention as will be described in greater detail below provides an apparatus, method and system for managing a next write pointer for each WORM-enabled volume. According to the present invention as illustrated in FIG. 8, a next write pointer 801 indicates which disk block number on the volume 802 a host can write data. If the disk block pointed to by the next write pointer 801 was already written (Read Only Area 803), then the next write pointer 801 is incremented so as to point to the next disk block at which data has not been written by the host (Read and Write Area 804). Further according to the present invention a write request from a host is ignored or an error message is returned by a storage system if the disk block number indicated by the write request is less than the disk block number pointed to by the next write pointer 801.

Figure 9:
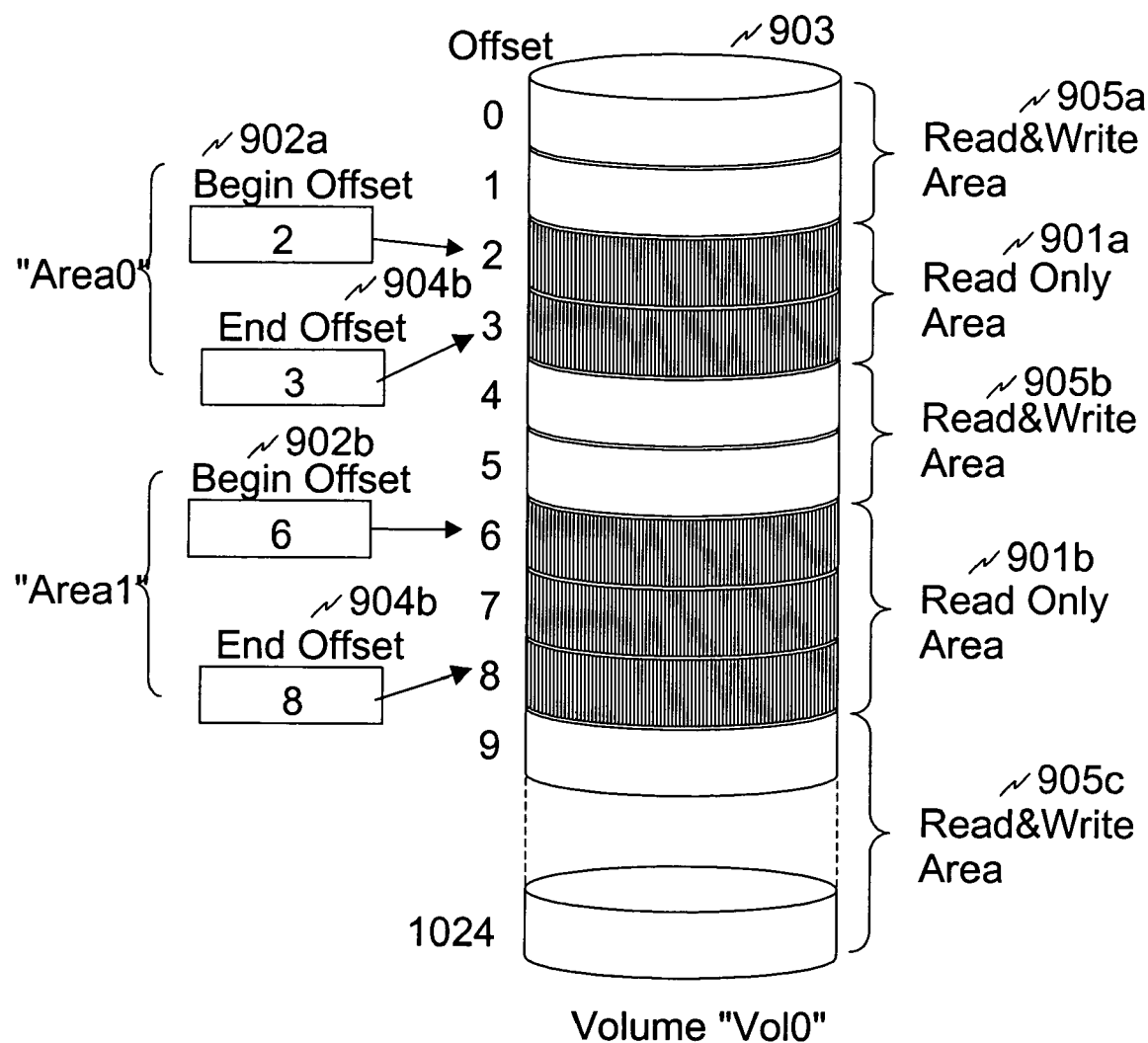
FIG. 9 is a diagram for explaining use of a write protected area according to the present invention.

The present invention provides another apparatus, method and system for managing a write-protected area. According to the present invention, as illustrated in FIG. 9, a write-protected area 901a, 901b is identified by using a volume ID in a storage system in a beginning offset 902a, 902b of the write protected area 901a, 901b and an ending offset 904a, 904b of the write protected area 901a, 901b in the volume 903. As per the present invention a write request from a host is ignored or an error message returned by a storage system, if an offset indicated by the write request is within one of write-protected areas 901a, 901b not the read and write areas 905a, 905b, 905c.

Further as per the present invention two or more write-protected areas are combined into one write-protected area, if these areas form a continuous area on the volume. When such combining is performed, the longest retention period within the combined write-protected areas is selected as the retention period for the combined write-protected areas.

The present invention provides various embodiments as described below. However it should be noted that the present invention is not limited to the embodiments described herein, but could extend to other embodiments as would be known or as would become known to those skilled in the art.

Embodiment 1

Figure 1:
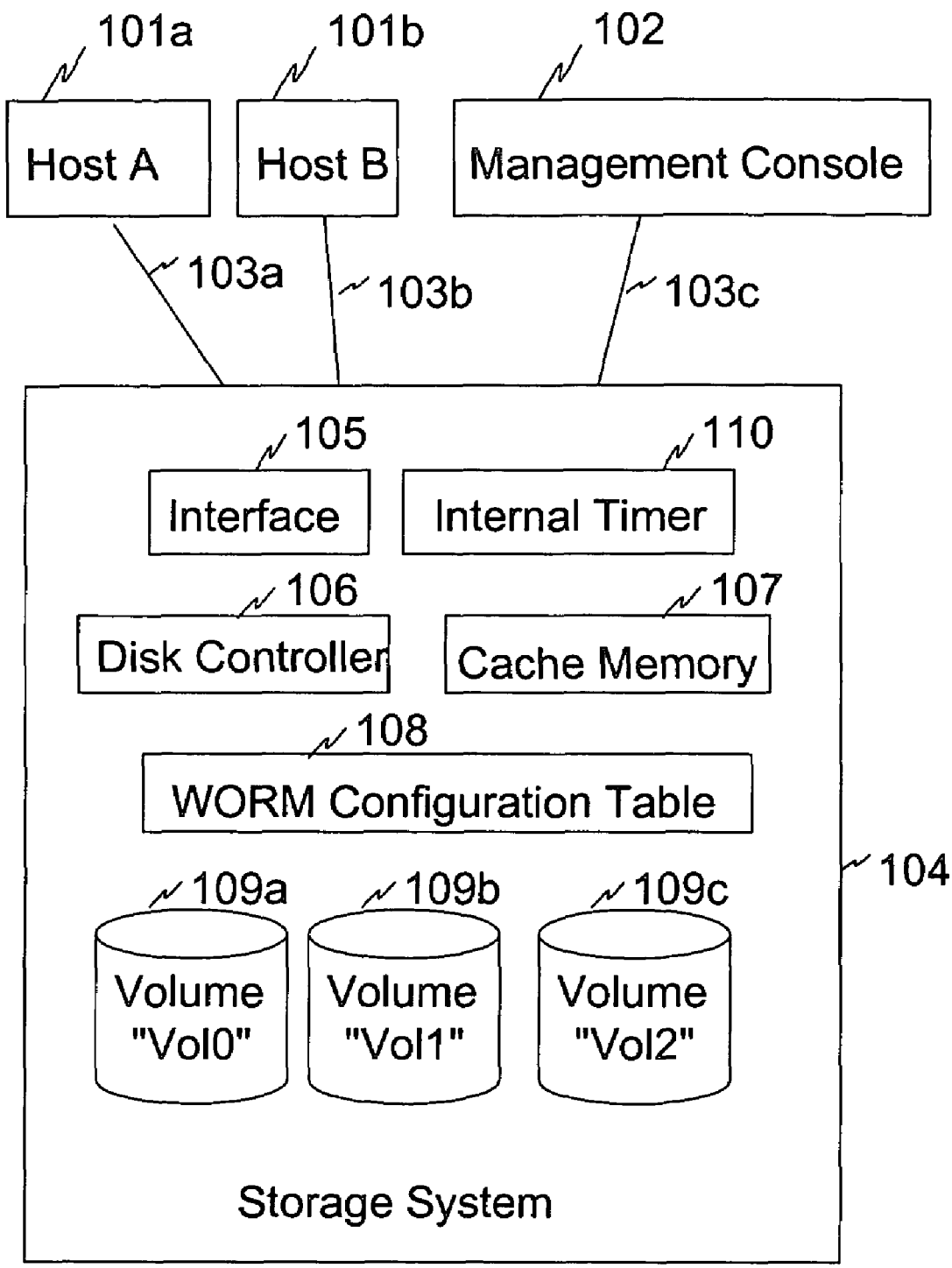
FIG. 1 is a diagram for explaining a storage system with a WORM configuration table according to the present invention.

The present invention provides a system configuration for the first embodiment as illustrated in FIG. 1, including a storage system 104, hosts 101a and 101b, and a management console 102.

The storage system includes multiple volumes 109a, 109b, 109c which are represented on storage media upon which data is stored and retrieved, an interface 105 which interfaces the storage system 104 with the hosts 101a, 101b, a disk controller 106 which controls the storage system 104, a cache memory 107 which temporarily stores data, an internal timer 110 which measures a period of time and a WORM configuration table 108 which stores information as to whether the volumes are WORM enabled. The details of the WORM configuration table 108 are discussed below.

The disk controller receives I/O requests from hosts 101a, 101b via a interface 105 and processes the requests. The disk controller accesses the cache memory 107 and the volumes 109a, 109b, 109c. The cache memory 107 caches some portions of data in the volumes 109a, 109b, 109c for faster access. The internal timer 110 measures a relative time and as such its value cannot be changed.

The hosts 101a, 101b run applications and conduct read/write of data from/to volumes 109a, 109b, 109c in a storage system via a link 103a, 103b as required by the applications. Typically Fibre channel, FICON, SCSI, Ethernet are used for the link 103a, 103b between a host 101a, 101b and a storage system 104. However, other types of links can be used.

The management console 102 is attached to a storage system 104 via a link 103c and provides management capabilities including configuring the WORM configuration table 108a in the storage system 104.

The first embodiment of the WORM configuration table 108a as illustrated in FIG. 2, includes various entries for each volume in a storage system 104. Particularly, the entries of the WORM configuration table indicate by use of a next write pointer which of a plurality of areas of the volume is write protected. The entries includes:

1) An identification of a volume 201,
2) An on/off indicator which indicates whether the volume is WORM-enabled 202.
3) An indication of block size at which data is write-protected 203.
4) An indication of the maximum number of blocks 204 (i.e. the capacity of the volume equals the block size times by the maximum number of blocks).
5) A next write pointer 205. The next write pointer has a block number and shows a host can read and write data between the block number indicated by the next write pointer and the maximum block number in a volume. On the other hand, the host can't write any data between the beginning of the block number, i.e. 0, and the block number indicated by the next write pointer minus one. FIG. 8 as described above illustrates an example of using the next write pointer. The volume named "Vol0" has 0 to 1024 disk blocks and the next write pointer indicates "3". So an area between the block 0 to block 2 is a read-only area and the other area is a read and write area.
6) A retention period 206. This period shows how long data in a volume needs to be write-protected after the volume has been filled by data, i.e. the next write pointer points to the maximum block number plus one. The value of the retention period is decreased by one a day. The storage system uses its internal timer to determine if a day is passed. If more granular retention is required, hours or minutes, seconds can be used as a unit.

The management console 102 and a host 101a,b can configure the WORM configuration table 108a. The disk controller allows them the following configurations:

1) Create a new entry for a specified volume only if there is no entry for the volume in WORM configuration table.
2) Make an entry WORM-enabled only if the entry isn't WORM-enabled.
3) Delete an entry only if the retention period of the entry equals to zero.
4) Read entries in WORM configuration table.

Figure 4:
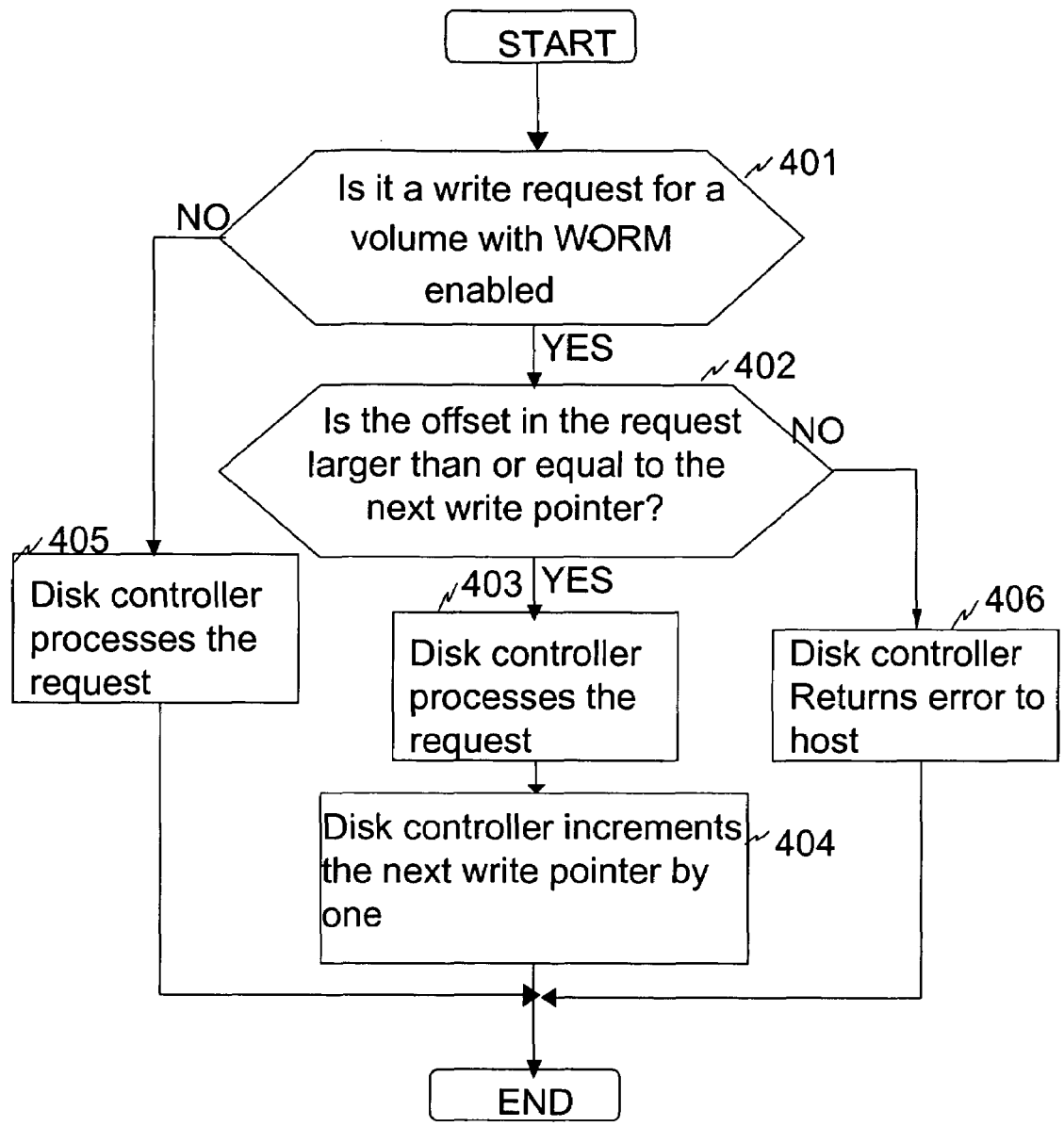
FIG. 4 is a flowchart illustrating a first embodiment of a procedure for processing a write request according to the present invention.

FIG. 4 is a flowchart illustrating a first embodiment of a procedure for processing a write request using the first embodiment of the WORM configuration table 108a according to the present invention. Particularly the flowchart of FIG. 4 illustrates processes to be conducted by the disk controller 106 if the disk controller 106 receives a write request from a host 101a,b.

Upon receipt of a write request the disk controller 106 checks if the write request is for any volume that is WORM enabled by using the WORM configuration table 108a. (Step 401). If write request is for a WORM enabled volume, then the process proceeds to Step 402. If write request is not for a WORM enabled volume, then the process proceeds to Step 405. The disk controller 106 checks if the offset specified by the write request is larger than or equal to the offset indicated by the next write pointer of the volume. (Step 402). If the offset specified by the write request is larger than or equal to the offset indicated by the next write pointer of the volume, then the process proceeds to Step 403. If the offset specified by the write request is not larger than or equal to the offset indicated by the next write pointer of the volume, then the process proceeds to Step 406. The disk controller 106 writes data in the request to the disk block pointed to by the next write pointer. (Step 403). The disk controller 106 increments a value of the next write pointer by one and exits this procedure. (Step 404) The disk controller 106 processes the write request and exits this procedure. (Step 405). The disk controller 106 returns an error message to the requesting host and exits this procedure. (Step 406).

Figure 6:
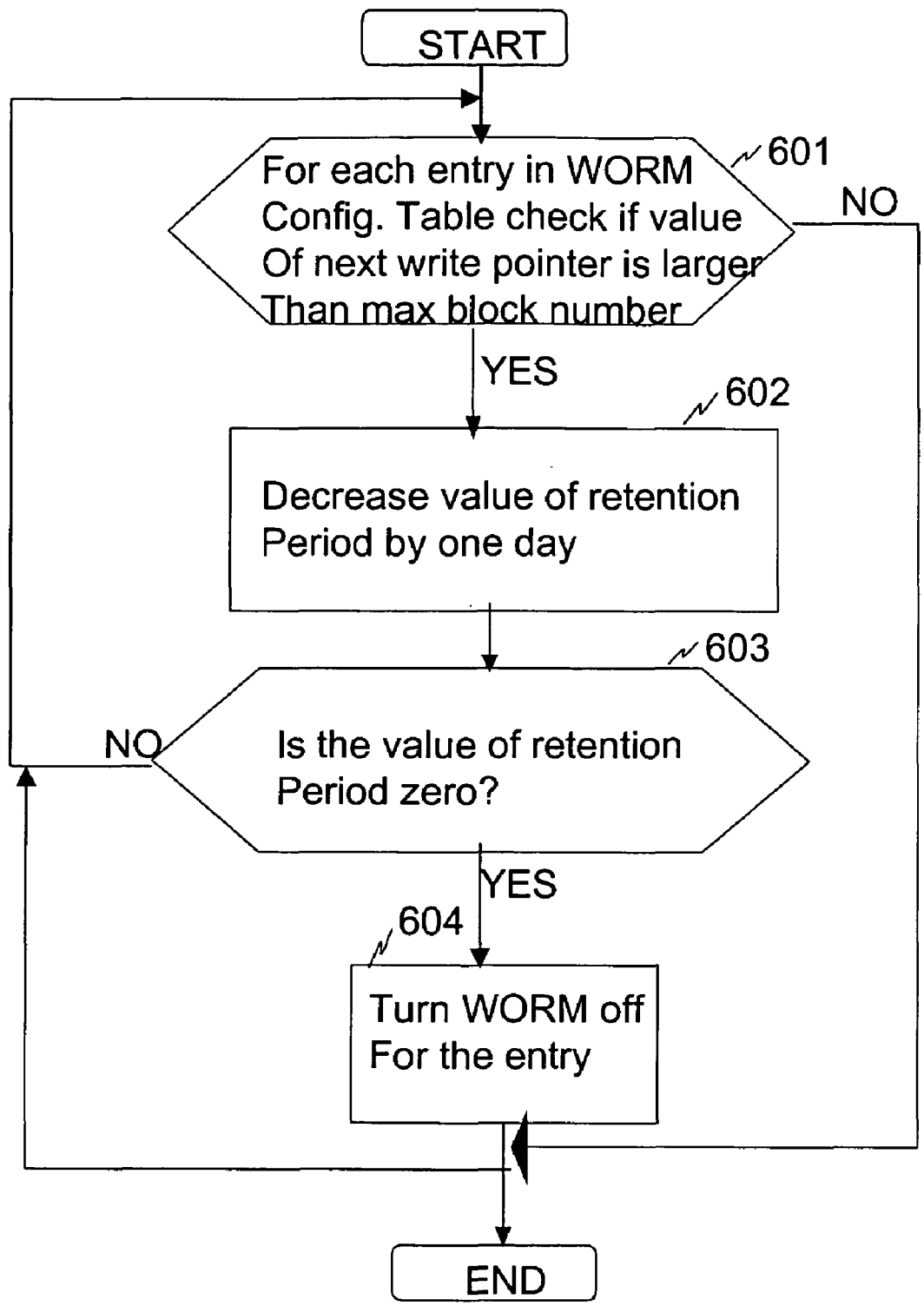
FIG. 6 is a flowchart illustrating a first embodiment of a procedure for decreasing a retention period according to the present invention.

FIG. 6 is a flowchart illustrating a first embodiment of a procedure for decreasing a retention period using the first embodiment of the WORM configuration table 108*a* according to the present invention.

According to the present invention the internal timer 110 of the storage system 104 sends an interrupt to the disk controller 106 once a day. The timing can be changed like once an hour, once a minute, etc. Alternatively, the disk controller 106 checks the internal timer 110 to determine how much time has passed since it previously checked the internal timer 110. Whether the disk controller 106 receives an interrupt or a day has passed, the disk controller 106 executes the process/procedure illustrated in FIG. 6.

Specifically according to the present invention, for each entry in the WORM configuration table 108*a*, the disk controller 106 checks if the value of the next write pointer is larger than the max block number (i.e. the volume has been filled by files). (Step 601). If the value of the next write pointer is larger than the max block number, then the process proceeds to Step 602. If there is no such entry in WORM configuration table, the process exits the procedure. If the value of the next write pointer is larger than the max block number, then the disk controller 106 decreases the value of the retention period by one day. (Step 602). The disk controller 106 then checks if the value of the retention period is zero. (Step 603). If the value of the retention period is zero, then the process proceeds to Step 604. If the value of the retention period is not zero not, then the process proceeds back to Step 601. Thereafter, the disk controller 106 turns WORM-enable off for the entry (i.e. the retention period for data in the volume has been expired). (Step 604). Then the process proceeds back to Step 601.

Embodiment 2

The present invention provides a system configuration for the second embodiment the same as that provided for the first embodiment as illustrated in FIG. 1, including a storage system 104, hosts 101*a* and 101*b*, and a management console 102. One of the differences between the first embodiment and the second embodiment is the WORM configuration table. The second embodiment provides a WORM configuration table 108*b* as illustrated in FIG. 3 which includes various entries for each volume in a storage system 104. These entries include:

1) An area ID (301) showing an identification of a write protected area.

2) A volume ID (302) in which the protected area is included.

3) A beginning offset (303) showing a beginning offset of the write protected area in the volume.

4) An ending offset (304) showing an ending offset of the write protected area in the volume.

5) A retention period (305) showing how long data in the protected area must remain read-only.

FIG. 9 illustrates an example of write-protected areas within a volume "Vol0". There are two areas, "Area0" and "Area1". Any areas specified by the write-protection areas cannot be written. The other areas are read and write areas.

A management console and a host can configure the WORM configuration table 108*b*. The disk controller 106 allows for the following configurations.

1) Create a new write protected area only if there is no offset-overlap among the new entry and entries in WORM configuration table.

2) Extend a retention period only if the new retention period is larger than the current retention period.

3) Delete an entry only if the retention period of the entry equals to zero.

4) Read entries in WORM configuration table.

5) Combine two or more protected areas into one protected area only if these areas are continuing. The largest retention period in the areas is selected as the combined write protected area.

Figure 5:
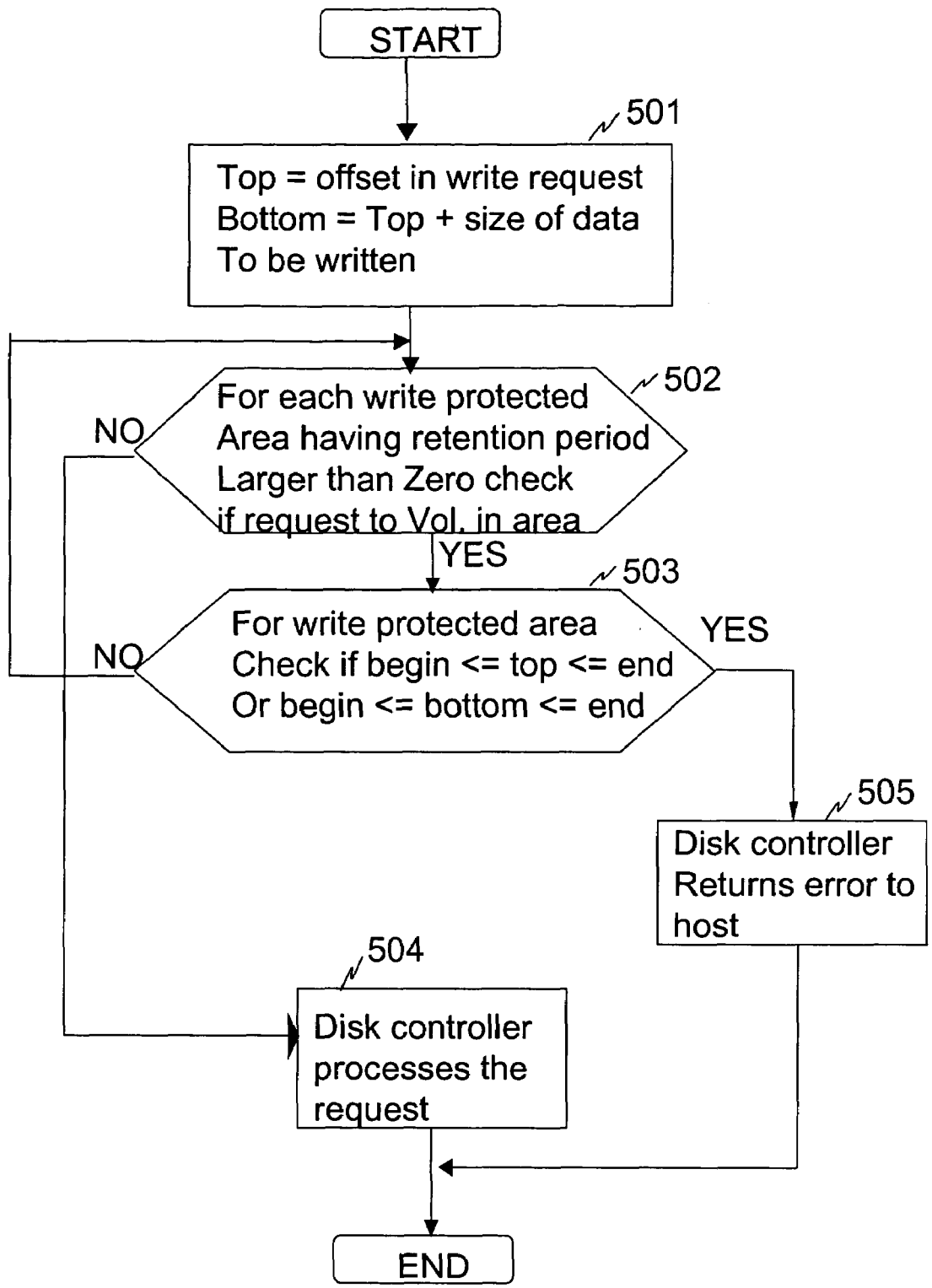
FIG. 5 is a flowchart illustrating a second embodiment of a procedure for processing a write request according to the present invention.

FIG. 5 is a flowchart illustrating a second embodiment of a procedure for processing a write request using the second embodiment of the WORM configuration table 108*b* according to the present invention. Particularly the flowchart of FIG. 5 illustrates processes to be conducted by the disk controller 106 if the disk controller 106 receives a write request from a host 101*a,b*. Upon receipt of a write request the disk controller 106 sets temporary values including Top=an offset specified in the write request. Bottom=Top+the size of data in the write request. (Step 501). For each write-protected area in the WORM configuration table 108*b* having a retention period that is larger than zero, the disk controller 106 checks if the write request is directed to a volume specified in the write protected area. (Step 502). If the write request is directed to a volume specified in the write protected area, the process proceeds to Step 503. If the write request is not directed to a volume specified in the write protected area, then the process proceeds to Step 504. The disk controller 106 checks whether one of the following conditions is satisfied for the write-protected area (i.e. is there any overlap between the area to be written and the write protected area): (1) Beginning Offset<=Top<=Ending Offset, (2) Beginning Offset<=Bottom<=Ending Offset. (Step 503). If there is an overlap between the area to be written and the write protected area, then the process proceeds to Step 505. If there is not any overlap between the area to be written and the write protected area, then the process proceeds to Step 502 to check another area. The disk controller 106 then processes the write request. (Step 504). Thereafter the disk controller 106 returns an error message to the requesting host. (Step 505).

Figure 7:
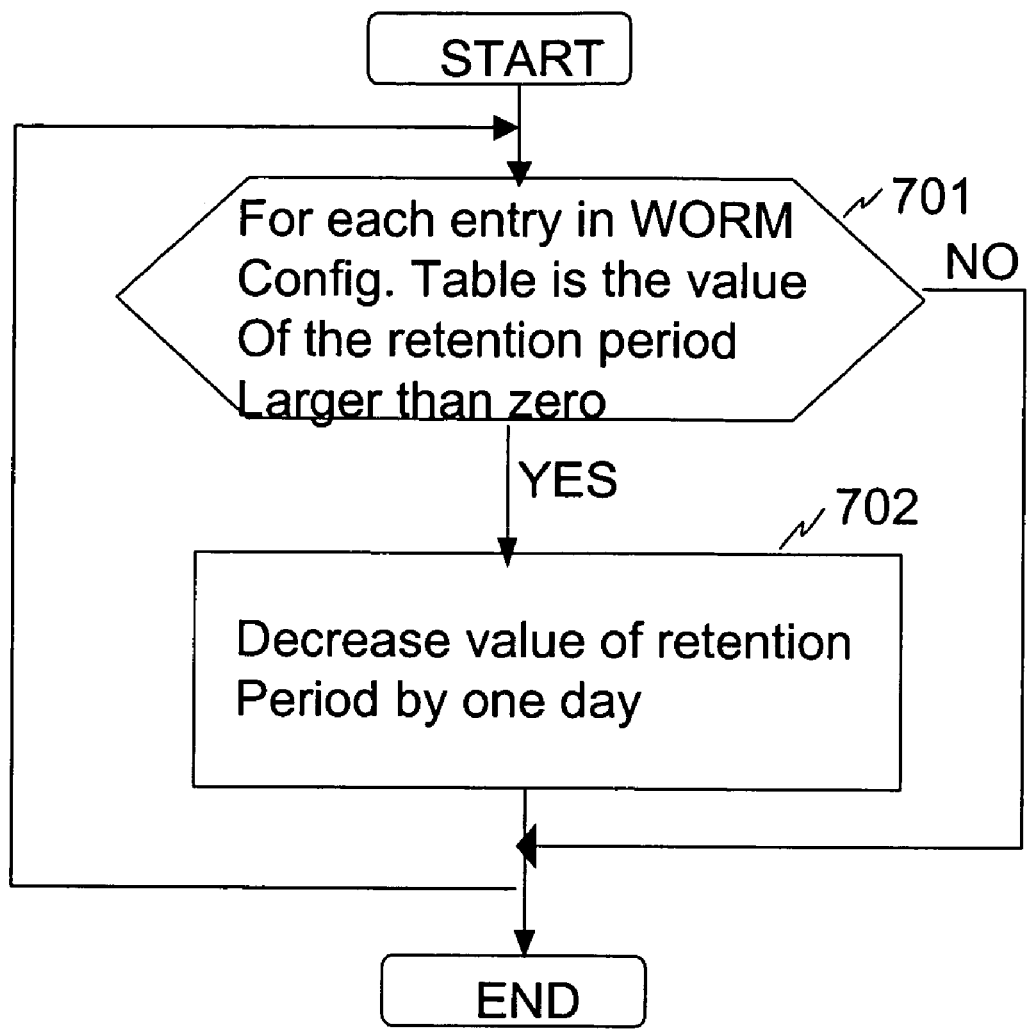
FIG. 7 is a flowchart illustrating a second embodiment of a procedure for decreasing a retention period according to the present invention.

FIG. 7 is a flowchart illustrating a second embodiment of a procedure for decreasing a retention period using the second embodiment of the WORM configuration table 108*b* according to the present invention.

According to the present invention the internal timer 110 of the storage system 104 sends an interrupt to the disk controller 106 once a day. The timing can be changed once an hour, once a minute, etc. Alternatively, the disk controller 106 checks the internal timer 110 to determine how much time has passed since it previously checked the internal timer 110. Whether the disk controller 106 receives an interrupt or a day has passed, the disk controller 106 executes the process/procedure illustrated in FIG. 7.

Specifically according to the present invention, for each entry in the WORM configuration table 108*b*, the disk controller 106 checks if the value of the retention period of the entry is larger than zero. (Step 701). If the value of the retention period of the entry is larger than zero, then the process proceeds to Step 702. If the value of the retention period of the entry is not larger than zero, then the process proceeds to exit the procedure. The disk controller 106 then decreases the value of the retention period by one day. (Step 702).

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A storage system for protecting data stored on a volume of said storage system comprising:
   a storage media upon which said volume is represented, said volume being made up of a plurality of areas to which data is able to be stored;
   a disk controller which controls said storage system; and
   a write once read many (WORM) configuration table having a plurality of entries which indicate by use of a next write pointer which of the plurality of areas of said volume are write protected and which of said plurality of areas are not write protected,
   wherein said entries indicate a retention period for said data stored on said volume, and
   wherein, when the retention period for the data stored on the volume expires, write protection for the data stored on the volume is turned off by updating said WORM configuration table.

2. A storage system according to claim 1, wherein said entries indicate whether said volume is WORM enabled, such that, when WORM enablement is turned on, writing of new data is inhibited to the areas of said volume that are write protected.

3. A storage system according to claim 1, wherein said entries indicate a size of each of said areas of said volume.

4. A storage system according to claim 1, wherein said areas are each a block of storage of said volume identifiable by a block number, and
   wherein the block numbers for said volume start at zero corresponding to a first storage location of said volume and increase in increments of one until the last storage location of said volume.

5. A storage system according to claim 4, wherein said next write pointer has a block number of a storage location at which data can be written, and
   wherein said next write pointer indicates that data cannot be written to blocks having a block number less than the block number of said next write pointer.

6. A storage system according to claim 4, wherein when said next write pointer points to a block number larger than the last storage location of said volume, said retention period is periodically reduced by a unit of time until the retention period expires.

7. A storage system according to claim 1, further comprising: an internal clock which is used to measure said retention period.

8. A storage system according to claim 1, further comprising: a management console which allows for creating or deleting said entries in said WORM configuration table.

9. A storage system according to claim 4, wherein said disk controller, in response to a write request from a host, checks whether a disk block specified by said write request is less than a disk block indicated by said next write pointer, and sends an error message to said host or ignores said write request if said disk block specified by said write request is smaller than said disk block indicated by said next write pointer.

10. A storage system for enabling and disabling write protection of data, comprising:
    a storage media upon which a volume is represented, said storage media being capable of storing data in a block-based format, wherein said volume is allocated consecutively numbered blocks, whereby the data is stored starting in a lowest numbered block and stored consecutively to a highest numbered block;
    a disk controller which controls write requests to the storage media; and
    a next write pointer maintained by said disk controller, said next write pointer pointing to a next block in said volume to which the data may be stored,
    wherein any blocks numbered below the next block are write protected by said disk controller, while the next block and any blocks of said volume numbered greater than said next block are not write protected,
    wherein when said next write pointer points to a block number larger than the highest numbered block of said volume, the disk controller periodically reduces a retention period for the data in the volume by a unit of time until the retention period expires, and
    wherein when said retention period for the data in the volume expires, the disk controller ends write protection for the volume.

11. The storage system according to claim 10, further including an internal clock that is used by said disk controller to measure said retention period.

12. The storage system according to claim 10, further including a management console that allows for creating or deleting said entries in a WORM configuration table, said WORM configuration table indicating by use of the next-write pointer which portions of said volume are write protected.

13. The storage system according to claim 10, wherein said disk controller, in response to a write request from a host, checks whether a disk block specified by said write request is less than the next disk block indicated by said next write pointer, and sends an error message to said host or ignores said write request if said disk block specified by said write request is smaller than said next disk block indicated by said next write pointer.

14. A method of enabling and disabling write protection of data in a storage system, the method comprising:
    providing a storage media upon which a volume is represented, said storage media being capable of storing data in a block-based format, wherein said volume is allocated consecutively numbered blocks numbered from a first block to a maximum block;
    providing indication that said volume is write-once-read-many (WORM) protected;
    storing data to said blocks starting with said first block and storing to consecutively-numbered higher blocks;
    providing a next-write pointer that points to a next block of said consecutively numbered blocks that has not yet been written to, wherein the data is able to be written to blocks greater than or equal to the next block, but cannot be written to blocks less than said next block, whereby said blocks less than said next block are write protected;
    providing a retention period for said volume that sets forth an amount of time that the data is to be retained;
    reducing the time remaining in said retention period periodically when the next-write pointer points to a block numbered higher than said maximum block;
    disabling write protection for said volume when said retention period expires; and
    providing an indication that said volume is no longer WORM protected.

15. The method according to claim 14, further including a step of:
    providing an internal clock which is used to measure said retention period.

16. The method according to claim 14, further including a step of:

while said volume is WORM protected, checking whether a block specified by a write request from a host is less than the next block pointed to by said next write pointer, and sending an error message to said host or ignoring said write request if said block specified by said write request is smaller than said next block pointed to by said next write pointer.

17. The method according to claim 16, further including a step of:

providing a management console that allows for creating or deleting entries in a write once read many (WORM) configuration table, said WORM configuration table indicating by use of the next-write pointer which portions of said volume are write protected.

* * * * *